(12) United States Patent
Alharbi et al.

(10) Patent No.: US 8,394,732 B2
(45) Date of Patent: Mar. 12, 2013

(54) SINTERED CORDIERITE GLASS-CERAMIC BODIES

(75) Inventors: Omar A. Alharbi, Riyadh (SA); Esmat M. Hamzawy, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/349,076

(22) Filed: Jan. 12, 2012

(65) Prior Publication Data

US 2012/0149542 A1 Jun. 14, 2012

Related U.S. Application Data

(62) Division of application No. 12/842,071, filed on Jul. 23, 2010.

(51) Int. Cl.
*C04B 35/195* (2006.01)
*C03C 10/08* (2006.01)
(52) U.S. Cl. .............. 501/119; 501/9; 501/128
(58) Field of Classification Search .......... 501/9, 119, 501/128
See application file for complete search history.

(56) References Cited

U.S. PATENT DOCUMENTS

| | | | |
|---|---|---|---|
| 3,744,984 A | 7/1973 | Sato | |
| 3,926,648 A * | 12/1975 | Miller | 501/9 |
| 3,940,255 A * | 2/1976 | Harrington et al. | 65/33.7 |
| 4,063,955 A * | 12/1977 | Fritsch et al. | 501/9 |
| 4,540,671 A | 9/1985 | Kondo et al. | |
| 4,973,566 A | 11/1990 | Ready et al. | |
| 5,030,398 A | 7/1991 | Hamanaka et al. | |
| 5,104,830 A | 4/1992 | Drouet et al. | |
| 5,114,643 A | 5/1992 | Beall et al. | |
| 5,185,215 A | 2/1993 | Adams, Jr. et al. | |
| 5,250,474 A * | 10/1993 | Siebers | 501/9 |
| 5,258,150 A | 11/1993 | Merkel et al. | |
| 5,332,703 A | 7/1994 | Hickman | |
| 5,356,841 A * | 10/1994 | Mizutani et al. | 501/32 |
| 5,407,871 A * | 4/1995 | Mizutani et al. | 501/9 |
| 5,409,870 A | 4/1995 | Locker et al. | |
| 5,532,194 A * | 7/1996 | Kawashima et al. | 501/9 |
| 6,004,501 A | 12/1999 | Cornelius et al. | |
| 6,300,263 B1 | 10/2001 | Merkel | |

(Continued)

FOREIGN PATENT DOCUMENTS

| | | |
|---|---|---|
| DE | 10242481 | * 12/2003 |
| EP | 2 065 346 | 6/2009 |

OTHER PUBLICATIONS

Office Action dated May 22, 2012 for U.S. Appl. No. 12/842,071.

(Continued)

*Primary Examiner* — Karl Group
(74) *Attorney, Agent, or Firm* — Andrew M. Calderon; Roberts Mlotkowski Safran & Cole, P.C.

(57) ABSTRACT

Disclosed is the preparation of sintered cordierite-based glass-ceramic bodies via a procedure which uses three all natural starting materials which are white sand, kaolin clay and magnesite. These three raw materials are combined in relative amounts which form, upon subsequent mixing and heating, a specific mixture of oxides of silicon, aluminum and magnesium. Upon melting at 1500-1550° C., this combination of raw materials forms transparent brown glass which after solidification by quenching is then crushed and reduced to grains having a median particle size less than 65 microns. These brown glass grains are consolidated, for example by compaction, to form a green body for sintering. Sintering of the green body at temperatures between about 1000° C. and 1375° C. for from 2 to 5 hours produces glass-ceramic bodies containing a polycrystalline material which comprises mostly material of the cordierite crystal structure.

17 Claims, 9 Drawing Sheets

X-Ray Diffraction Patterns for the Examples 1-4 (B1-B4) Bodies Sintered at 1375 °C/5 Hours

U.S. PATENT DOCUMENTS

| | | | |
|---|---|---|---|
| 6,319,870 B1 | 11/2001 | Beall et al. | |
| 7,465,687 B2 * | 12/2008 | Beall | 501/9 |
| 7,625,509 B2 | 12/2009 | Rosenflanz | |
| 2009/0069163 A1 | 3/2009 | Beall | |

OTHER PUBLICATIONS

Mei et al., "The desification and morphology of cordierite-based glass-ceramics", Science Direct, Materials Letters, vol. 47, Issues 4-5, Feb. 2001, pp. 205-211.

Watanabe et al., "Cyrstallization kinetics of high-cordierite glass", Journal of Non-Crystalline Solids 169, 1994, pp. 306-310.

Hamzawy et al., "Sol-gel preparation of boron-containing cordierite Mg2(A14-xBx)Si5O18 and its crystallization", Materials Characterization, 2006 (5 pages).

Hamzawy et al., "Desification and properties of glass/cordierite composites", Ceramics International, 2004, pp. 1-7.

Naga et al., "Production of cordierite bodies from Saudi raw materials", Industrial Ceramics, vol. 21, No. 1, 2001 (7 pages).

Office Action dated Mar. 1, 2012 for U.S. Appl. No. 12/842,071.

Al-Harbi and Khan. "Utilization of Local Raw Materials for the Production of Commercial Glasses". Trends in Applied Science Research, 4(4):176-187, 2009.

* cited by examiner

Stages of Sintered Glass-Ceramic Production

DSC Thermal Analysis of Example 1-4 (B1-B4) Glasses

Cordierite Samples Morphology After Sintering From 1000 °C to 1375 °C

X-ray Diffraction Patterns for the Examples 1-4 (B1-B4) Bodies Sintered at 1200 °C/5 Hours

SEM of Examples 1-4 Bodies Sintered at 1200 °C for 5 Hours

X-Ray Diffraction Patterns for the Examples 1-4 (B1-B4) Bodies Sintered at 1375 °C/5 Hours

SEM of Examples 1-4 Bodies Sintered at 1376 °C for 5 Hours

Coefficient of Thermal Expansion of Examples 1-4 (B1- B4) Bodies Sintered at 1200 °C for 5 Hours

Dielectric Constant of Examples 1-4 (B1-B4) Bodies Sintered at 1375 °C within 1-5 MHz Frequency

SINTERED CORDIERITE GLASS-CERAMIC BODIES

CROSS REFERENCE TO RELATED APPLICATIONS

The present application is a divisional application of co-pending U.S. patent application Ser. No. 12/842,071, filed on Jul. 23, 2010, the contents of which are herein incorporated by reference in their entirety.

FIELD OF THE INVENTION

The present invention relates to the preparation of glass-ceramic bodies with a portion thereof comprising a polycrystalline material being primarily of the cordierite structure. Such bodies are prepared from all natural raw materials, preferably materials found naturally within the Kingdom of Saudi Arabia.

BACKGROUND

Glass-ceramic material and articles are of increasing commercial relevance. Currently there is worldwide interest in cordierite-containing glass-ceramics, which are based on an MgO—$SiO_2$—$Al_2O_3$ crystalline system, due to their excellent mechanical properties, low dielectric constant and low coefficient of thermal expansion (CTE). Because of these characteristics, cordierite-based glass-ceramics are widely used as kiln furniture in white ware industry, as well as in the micro-electronic packaging industry.

There are a number of different methods for preparation the cordierite glass/ceramic material. Hamzawy et al; "Densification and properties of glass/cordierite composites"; Ceramics International, Vol. 31, Issue 3, 2005, pp 383-389 discloses a solid reaction method for preparing glass/cordierite composites from separate glass and cordierite batches synthesized from pure chemicals. Hamzawy et al; "Sol-gel preparation of boron-containing cordierite $Mg_2(Al_{4-x}B_x)Si_5O_{18}$ and its crystallization"; Material Characterization, Vol. 57, Issues 4-5, December, 2006; pp 414-418 discloses preparation of boron-containing cordierite powders from amorphous gels. Omar et al in a presentation entitled "Crystallization of cordierite-spodumene glass" at the $2^{nd}$ Conference on Physics of Condensed Matter (PCM89) in Jordan on Mar. 20-24, 1989 disclosed a glass crystallization method for cordierite preparation. Using Saudi raw materials such as MgO (91%) from sea water and pure $Al_2O_3$ (99%), Naga et al.; "Production of cordierite bodies from Saudi raw materials"; Industrial Ceramics, Volume 21, Issue 1, 2001; pp. 1-4 discloses preparation of cordierite ceramics containing mainly cordierite with secondary mullite, quartz and cristobalite. Preparation of glass ceramics by means of the sintering of cordierite constituents from its chemical powder and glass powders is also known.

Preparation of a variety of cordierite-based ceramics and glass-ceramics has also been disclosed in the patent literature. U.S. Pat. No. 5,030,398 discloses the preparation of honeycomb cordierite bodies from very fine particles of kaolin and talc to restrict a total pore volume of a given pore diameter to a given range. The structures produced have very low porosity, low thermal expansion ($10\times10^{-7\circ}$ $C.^{-1}$) and good resistance to thermal shock.

U.S. Pat. No. 5,409,870 discloses preparation of cordierite materials from a mixture of primary raw materials including specific types of talc and clay. This cordierite material has a coefficient of thermal expansion of less than $5\times10^{-7\circ}$ $C.^{-1}$. Similarly, U.S. Pat. No. 4,973,566 discloses preparation of porous cordierite ceramic containing 95% of cordierite mineral from alumina, clay, talc and a pore-forming material. The produced ceramic materials have crush load strength of >6 pounds, electrical conductivity up to 5 watt/m2/° C. and can be used as a heat source retainer. U.S. Pat. No. 5,114,643 discloses fabrication of cordierite bodies from silica, and magnesium aluminate spinel, but no clay or talc. The bodies produced contain up to 90% of cordierite mineral and have a coefficient of thermal expansion less than $16\times10^{-1\circ}$ $C.^{-1}$ within the range of 25-1000° C.

Using fast firing with a heating rate of 70° C./min, U.S. Pat. No. 6,004,501 discloses preparation of cordierite ceramic from specified amounts of various cordierite-forming materials, such a talc, magnesium aluminate spinel, kaolin and mullite, at a temperature within the range of 1360-1435° C. The cordierite ceramic so produced is characterized by a low coefficient of thermal expansion (CTE) of $9\times10^{-1\circ}$ $C.^{-1}$ (25-800° C.). U.S. Pat. No. 5,332,703 discloses batch preparation of low porosity, high strength and low CTE cordierite ceramic by firing a combination of the minerals clay and talc along with chemical components such as oxides, and hydroxides of magnesium, aluminum and silicon. U.S. Pat. No. 6,319,870 discloses preparation of low CTE, high strength cordierite structures from specific mixtures of $SiO_2$, $Al_2O_3$ and MgO-yielding materials. The produced structures have 20% porosity, with a primary crystalline cordierite phase of 65-95% and a secondary phase of mullite, spinel, and sapharine.

More recently, U.S. Patent Application Publication No. 2009/0069163 has disclosed preparation of self nucleating cordierite-based glass-ceramics with possible addition $TiO_2$ (8-9%) to increase the nucleation process. The formed phases in such glass-ceramic include cordierite, enstatite and anorthite. These glass ceramics have a circular microstructure, good microhardness, low density, good refractoriness, and good strength (similar to SiN) phases.

It can be seen from the foregoing, that cordierite-based ceramic and glass-ceramic materials have been prepared from a wide variety of starting materials, using a wide variety of techniques and procedures. Given the desirable thermal, hardness and dielectric properties which such cordierite materials can provide, it would be advantageous to continue to identify materials and processes which can be used to prepare cordierite glass-ceramics. Desirably, the starting materials used for cordierite preparation would be naturally occurring raw materials in need of little of no purification or preparation processing prior to being employed in glass-ceramic synthesis. Ideally, such naturally occurring raw materials could also all be found and recovered from the same geographic area to minimize mining, processing and transportation costs.

SUMMARY

The present invention is directed to a process for preparing a glass-ceramic body starting from all natural raw materials. Such a glass-ceramic body is one which possesses density, microhardness, coefficient of thermal expansion (CTE), and dielectric constant characteristics which make it suitable of a variety uses including, water filtration equipment and devices, and cookware.

In the first step of such a process, the natural raw materials of white sand, kaolin and magnesite are combined. These three raw materials should be combined in relative amounts suitable to provide, upon the subsequent homogenization and heat treatment hereinafter described, a mixture of oxides comprising from about 50 wt % to 60 wt % of $SiO_2$; from about 25 wt % to 35 wt % of $Al_2O_3$, from about 8 wt % to 12 wt % of MgO, from about 2.5 wt % to 3.5 wt % of $TiO_2$ and from about 0.5 to 1.0 wt % of $Fe_2O_3$.

In the second step of the process herein, the combination of natural raw materials is melted at a temperature of from about 1500° C. to 1550° C. to form glass material. This molten glass material is then quenched to solid form.

In a third step of the process, the quenched glass material is crushed to frit having a median particle diameter of no greater than about 65 microns. And in a fourth process step, the fit material so formed is consolidated into a body or structure.

In a fifth process step, the body of material formed from the frit is sintered at a temperature of from about 1000° C. to 1375° C. This sintering occurs for a sufficient period of time to devitrify at least a portion of the glass into a polycrystalline material.

In a final process step, the sintered body from the fifth process step is cooled to provide a glass-ceramic body comprising a polycrystalline material which is primarily cordierite. This cordierite-based glass ceramic body will preferably have a microhardness value ranging from about 650 to 680 kg/mm; a density ranging from about 2.5 to 2.6 g/cm$^3$, a coefficient of thermal expansion (CTE) which ranges from about $-28.38$ to $57.75 \times 10^{-7\circ}$ C.$^{-1}$ in the temperature range of from 28° C. to 1000° C., and a dielectric constant ranging from about 19 to 35 in the 1 to 5 MHz frequency range.

BRIEF DESCRIPTION OF THE SEVERAL VIEWS OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
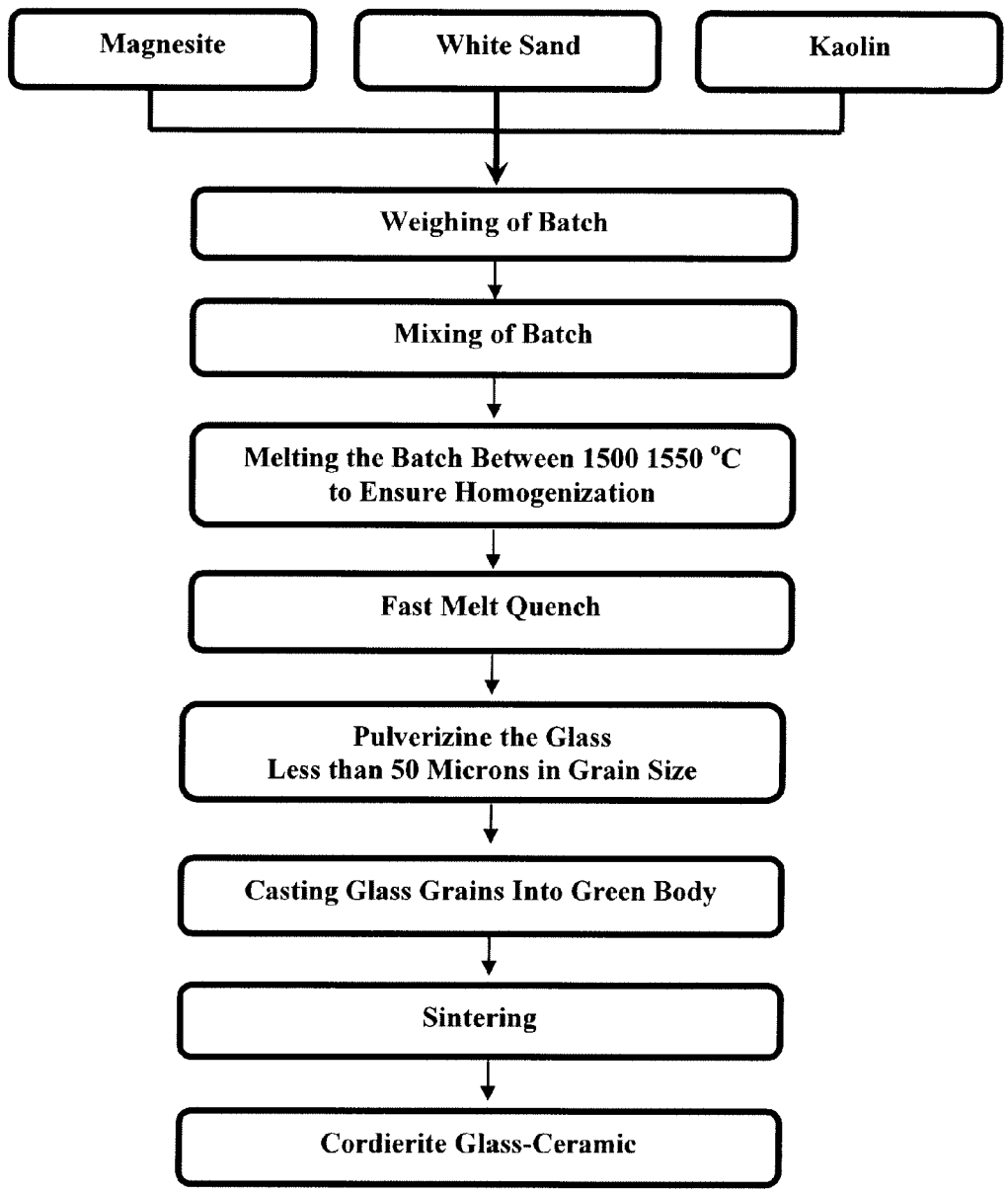
FIG. 1 is a flow chart showing the several steps of the glass-ceramic preparation process herein.

The present invention relates to the preparation of cordierite-containing glass-ceramic bodies starting from all natural materials. Preparation from all natural materials means that no lab grade materials are used to form the glass-ceramic bodies herein.

In the preparation of the glass ceramic bodies of this invention, three selected types of natural raw materials are used. These selected raw materials comprise white sand, kaolin clay and the raw mineral magnesite. In the first step of the process herein, these three raw material types are combined in relative amounts which are suitable to provide upon subsequent homogenization mixing and heat treatment a certain mixture of oxides.

The mixture of oxides formed by combining and subsequently homogenizing and heating the three essential raw materials must comprise from about 50 wt % to 60 wt % of $SiO_2$ (silicon dioxide), from about 25 wt % to 35 wt % of $Al_2O_3$ (alumina); from about 8 wt % to 12 wt % of MgO (magnesia or magnesium oxide); from about 2.5 wt % to 3.5 wt % of $TiO_2$ (titanium dioxide) and from about 0.5 wt % to 1.0 wt % of $Fe_2O_3$ (ferric oxide or iron III oxide). More preferably, the mixture of oxides formed by combining and subsequently homogenizing and heating the three essential raw materials will comprise from about 53 wt % to 59 wt % of $SiO_2$, from about 27 wt % to 34 wt % of $Al_2O_3$; from about 9.5 wt % to 11.8 wt % of MgO; from about 2.8 wt % to 3.4 wt % of $TiO_2$; and from about 0.65 wt % to 0.75 wt % of $Fe_2O_3$. In some preferred embodiments, the mixture of oxides provided by combining the three essential raw materials will comprise up to about 0.18 wt % of CaO (calcium oxide) and/or up to about 0.23 wt % of $Na_2O$ (sodium oxide).

White sand is used as the principal source of $SiO_2$ in the essential mixture of oxides which are formed from the combination of raw materials. White sand is, of course, readily available in natural form in many geographical locations including Saudi Arabia. White sand grains will typically range in size from 0.25 to 0.35 mm. The content of white sand in the combination of raw material can affect the appearance of the glass ceramic bodies which are formed therefrom. Higher contents of white sand give glass-ceramic bodies which are lighter in color.

Kaolin clay is the principal source of $Al_2O_3$ to be found in the mixture of oxides described above. Kaolin clay also contributes $SiO_2$ to the oxide mixture as well as the essential amounts of $TiO_2$ and $Fe_2O_3$. Kaolin clay, also known as white clay or china clay, provides the mineral kaolinite which is an aluminosilicate having the chemical composition of $Al_2Si_2O_5(OH)_4$. Kaolin type clays undergo a series of phase transformations upon thermal treatment in air at atmospheric pressure. Kaolin clay, like white and, is found in a number of different geographical locations including Saudi Arabia.

Magnesite is the third essential component of the combination of raw materials used in the preparation of the cordierite-based glass-ceramic bodies herein. Magnesite is a naturally occurring mineral which chemically comprises hydrated $MgCO_3$ (magnesium carbonate). Magnesite may also contain small amounts of iron as $FeCO_3$ as well as small amounts of calcium, manganese, cobalt and nickel. Like the other naturally occurring raw materials, magnesite can also be found in a number of geographical locations including Saudi Arabia.

The three essential raw materials are preferably combined in any conventional mixing or blending apparatus which can be used to form a mixture, preferably substantially uniform, of the three mineral components. Such mixing apparatus will, in fact generally be suitable for forming a substantially uniform homogeneous mixture of solid particles, preferably ranging in size from about 0.05 to 0.15 mm. The apparatus used may therefore serve to provide crushing, grinding and/or milling of the raw material combination as needed to provide the desired substantially uniform particle blend.

In order to provide the requisite mixture of oxides, a preferred mixture of the three mineral components will frequently comprise from about 7 wt % to 21 wt % of white sand; from about 60 wt % to 70 wt % of kaolin clay; and from about 19 wt % to 22 wt % of magnesite. More preferably, the blend of the three mineral components can comprise from about 10 wt % to 20 wt % of white sand; from about 62 wt % to 68 wt % of kaolin clay; and from about 20 wt % to 21 wt % of magnesite.

To ensure homogeneous mixture of the oxides provided by the combination of raw material minerals, the blended mixture of the three minerals is melted at a temperature of from about 1500° C. to 1550° C. for a period of time sufficient to form amorphous glass material. Melting can take place in any suitable container or vessel such as a crucible. In some embodiments, the crucible may have an orifice to discharge the melt. Common crucible materials are known in the art and include graphite, metals (e.g., platinum and platinum/rhodium) and ceramics (e.g. sintered alumina). The crucible can be heated using techniques known in the art, including the use of resistance or induction furnaces.

The resulting amorphous melt is solidified by any suitable conventional quenching technique. Quenching can be carried out, for example, by discharging the melt into a cooling media such as high velocity air jets, liquids, metal plates (including chilled metal plates), metal rolls (including chilled metal rolls), metal balls (including chilled metal balls), and the like. Quenching of the amorphous mixture of oxides provided by the raw materials used herein forms a transparent brown glass material.

The initially formed brown glass material is next converted into smaller particles, e.g., glass frit, before being processed. The brown glass material can be converted into frit using crushing and/or comminuting techniques known in the art, including roll crushing, canary milling, jaw crushing, hammer milling, ball milling, jet milling, impact crushing, and the like. In some instances, it may be useful to have two or multiple crushing steps. For example, after the brown glass is formed (solidified), it will generally be in the form of pieces which are larger than desired. A first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution.

For use in the present invention and for subsequent consolidation into a body, the glass frit formed from the brown glass should have a median particle size no greater than about 65 microns. More preferably, the median particle size of the glass frit can range from about 45 to 50 microns. For consolidation into a body, the glass frit material may or may not be combined with any other materials such as binders or processing aids.

In the next step of the process herein, the crushed brown glass frit having the particle size characteristics hereinbefore described is consolidated into a body, also known as a "green body", for subsequent further sintering treatment. Such consolidation will generally be carried out using any of the conventional molding techniques which are customary to the ceramics industry. Such molding techniques can include, for example, dry pressing, semi-dry pressing, compacting, cold isostatic pressing, hot pressing, uniaxial or biaxial pressing, extrusion molding, injection molding, compression molding, gel casting, slip casting and/or tape casting. In the case of the pressing molding techniques, pressures employed can range from about 10 to 200 MPa, more preferably from about 50 to 100 MPa.

In the next step of the process herein, the body consolidated from the glass frit is sintered in order to devitrify at least a portion of the glass into a polycrystalline material. Sintering of the body is carried out at a temperature of from about 1000 C to 1375 C for a sufficient period of time for the formation of the polycrystalline material to occur. More preferably, sintering is carried out at a temperature between about 1250 C and 1350 C for a period of from about 2 to 5 hours.

In the final step of the process herein, the sintered body is cooled to provide a sintered glass-ceramic body comprising a polycrystalline phase which is primarily cordierite. Generally the polycrystalline material will comprise from about 85 wt % to 95 wt % of the glass-ceramic body. Generally from about 80 wt % to 90 wt % of the polycrystalline phase will be cordierite with the balance of the crystalline material comprising traces of olivine ($MgSiO_4$) having the crystal structure of forsterite. The glass-ceramic bodies herein sintered within the temperature ranges specified herein have creamy, yellowish and grey colors.

The process herein for preparing the cordierite-based glass-ceramic bodies is further illustrated by FIG. 1. FIG. 1 is a flow chart showing the steps of the glass ceramic synthesis procedure starting with the formation of the mixture of the three types of raw materials and ending with the cordierite glass-ceramic body.

The cordierite glass-ceramic bodies prepared as described herein from totally natural (and preferably Saudi) raw materials (without any addition of laboratory grade materials) have wide application due to their low density, good microhardness values (similar to quartz), low coefficient of thermal expansion, high resistance to heat and deformation, high resistance to thermal shocks and desirable dielectric constant characteristics. These properties make the glass-ceramic bodies herein especially useful in various technical fields including, water filtration devices and equipment and cookware.

Density of the glass-ceramic bodies prepared as described herein can rage from about 2.5 to 2.6 $g/cc^3$. More preferably, the density of the cordierite-based glass-ceramic bodies herein can range from about 2.52 to 2.53 $g/cc^3$.

Microhardness of the glass-ceramic bodies prepared as described herein is a measure of the resistance of the glass ceramic material to scratching or indentation. Microhardness of the cordierite based glass-ceramic bodies can be determined herein using the procedures of ASTM E-384 and is reported as Vickers Hardness (VH). Values for Vickers Hardness are given in kilograms of force per square millimeter of area. Microhardness VH values for the glass-ceramic bodies of this invention are similar to that of quartz and can range from about 650 to 800 $kg/mm^2$, more preferably from about 750 to 790 $kg/mm^2$.

The Coefficient of Thermal Expansion (CTE) is a conventional thermodynamic property of glass-ceramic material of the type prepared herein. The CTE of the cordierite-based glass-ceramic bodies as prepared herein will generally range from about −28.38 to 57.75 in the temperature range of form 28° C. to 1000° C.

The dielectric constant (k) is a number relating the ability of a material such as glass ceramic to carry alternating current to the ability of vacuum to carry alternating current. The dielectric constant thus provides an indication of the suitability of glass-ceramic material to function as an electrical insulator. The dielectric constant of the cordierite-based glass-ceramic bodies as prepared herein will generally range from about 19 to 35 in the frequency range of 1 to 5 MHz. The best insulating performance of the glass-ceramic bodies herein is at the 3 MHz frequency.

EXAMPLES

Preparation of the glass-ceramic bodies of the present invention is illustrated by the following examples:

Four different combinations (Examples 1-4) of white sand, kaolin clay and magnesite are made. These four combinations of raw materials provide, upon subsequent homogeneous mixing and heating, the four different mixtures of oxides shown for each of the four examples in Table 1.

TABLE 1

Oxide Mixtures From Combinations of Raw Materials

Chemical Composition (Weight %)

| EXAMPLE NO. | $SiO_2$ | $Al_2O_3$ | $Fe_2O_3$ | MgO | CaO | $K_2O$ | $Na_2O$ | $TiO_2$ | $P_2O_5$ |
|---|---|---|---|---|---|---|---|---|---|
| 1 | 50.05 | 33.53 | 0.75 | 11.79 | 0.18 | 0.05 | 0.23 | 3.40 | 0.02 |
| 2 | 54.42 | 30.48 | 0.70 | 10.71 | 0.16 | 0.04 | 0.21 | 3.26 | 0.02 |
| 3 | 57.36 | 28.71 | 0.67 | 10.09 | 0.14 | 0.03 | 0.11 | 2.87 | 0.02 |
| 4 | 58.77 | 27.59 | 0.65 | 9.69 | 0.12 | 0.02 | 0.09 | 2.80 | 0.01 |

The four different mixtures of raw materials are then processed into glass ceramic discs following the general procedure shown in FIG. 1. In particular, each batch of raw materials is thoroughly mixed and then melted in sintered alumina crucibles in the temperature range of 1500° C. to 1550° C. for 3 hours. The glass in the crucibles is then air quenched to form transparent brown glass which is crushed and pulverized to grains of less than 65 microns in average diameter. Glass grains from each of the four examples (having the oxide compositions shown in Table 1) are then consolidated into eight discs (10 mm in diameter×6 mm thick) by dry pressing at a compaction pressure of 490 MPa. Each of the eight discs from each of the four examples is then sintered at eight different temperatures (1000° C.; 1050° C.; 1200° C.; 1250° C.; 1300° C.; 1325° C.; 1350° C.; and 1375° C.) ranging from 1000° C. to 1375° C. for 5 hour periods at each temperature.

Figure 2:
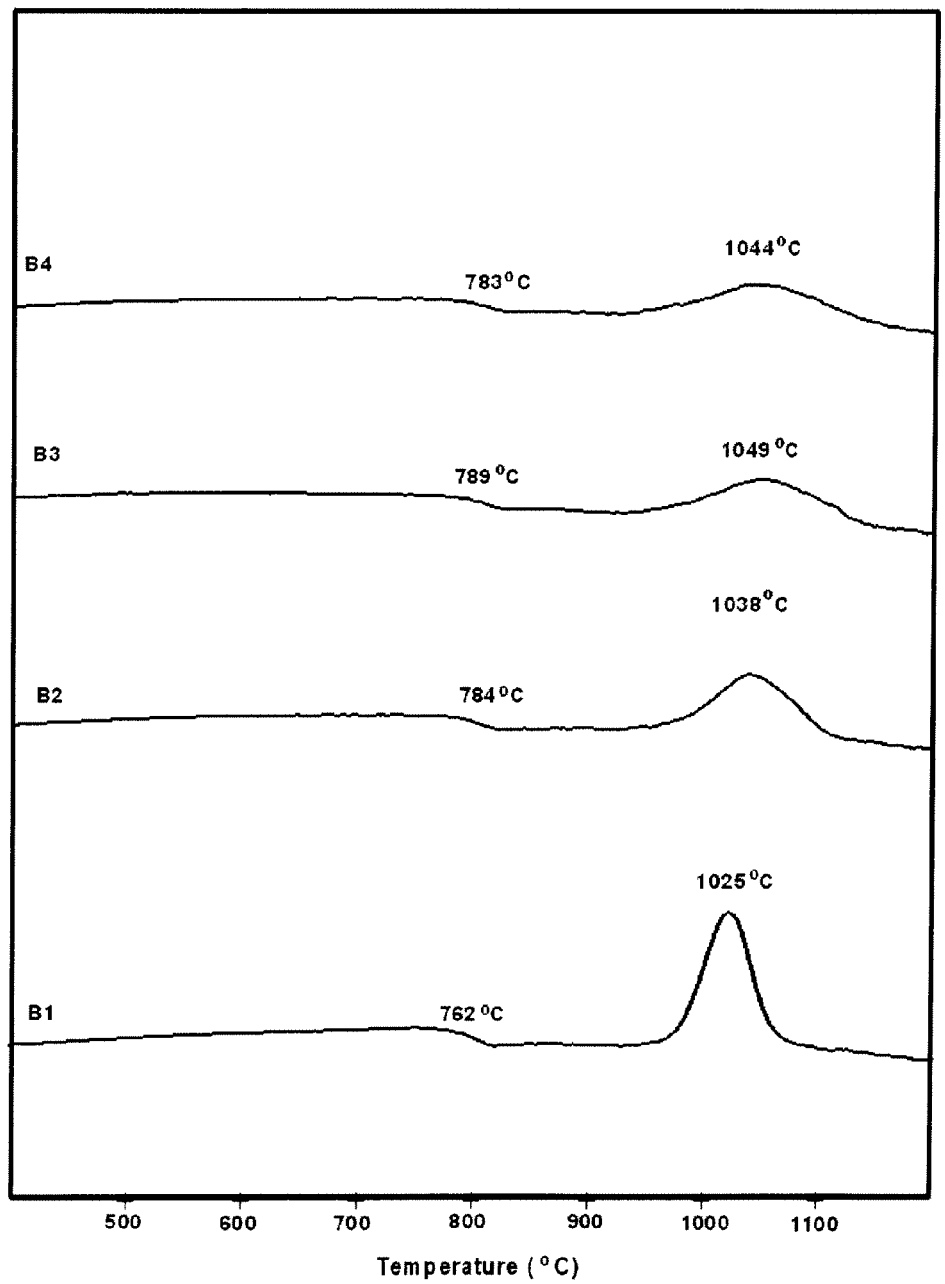
FIG. 2 shows differential thermal analysis of the four glass-ceramic samples.

FIG. 2 shows via differential thermal analysis that the transition temperature of each of the four samples ranges from 776° C. to 786° C. and that the range of crystallization temperatures ranges from 1024° C. to 1042° C. Although the crystallization temperature increases with an increase in $SiO_2$ content, this does not affect the density of the sintered samples as shown in the following Table 2.

TABLE 2

Microhardness Values and Densities for Sintered Glass-Ceramic Samples at 1375° C.

| Example No. | Density (g/cm$^3$) | Hardness value VH (Kg/mm$^2$) |
|---|---|---|
| 1 | 2.521 | 750 |
| 2 | 2.523 | 770 |
| 3 | 2.522 | 787 |
| 4 | 2.522 | 789 |

Figure 3:
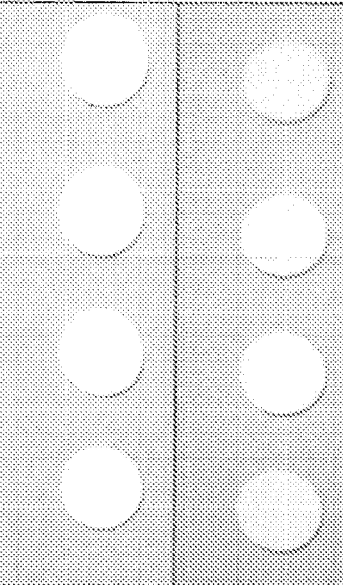
FIG. 3 shows morphology of the four samples after sintering at eight temperatures ranging from 1000° C. to 1375° C.

FIG. 3 shows the appearance of discs of each of the four examples sintered at the eight different temperatures for 5 hours. It can be seen from FIG. 3 that discs of each of the four examples are resistant to temperature deformation up to 1375° C.

Figure 4:
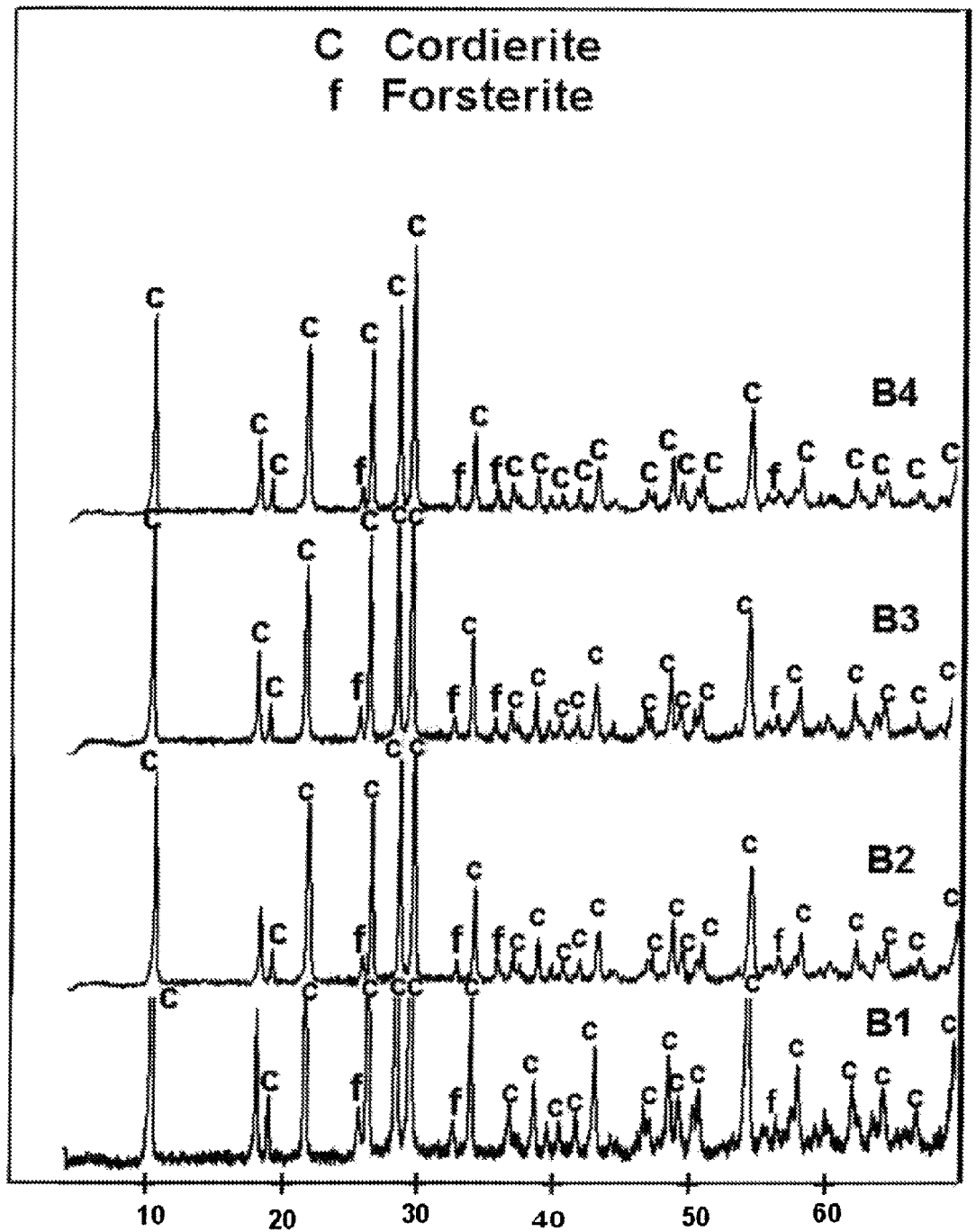
FIG. 4 shows x-ray diffraction patterns of the four glass-ceramic samples sintered at 1200° C.
Figure 5:
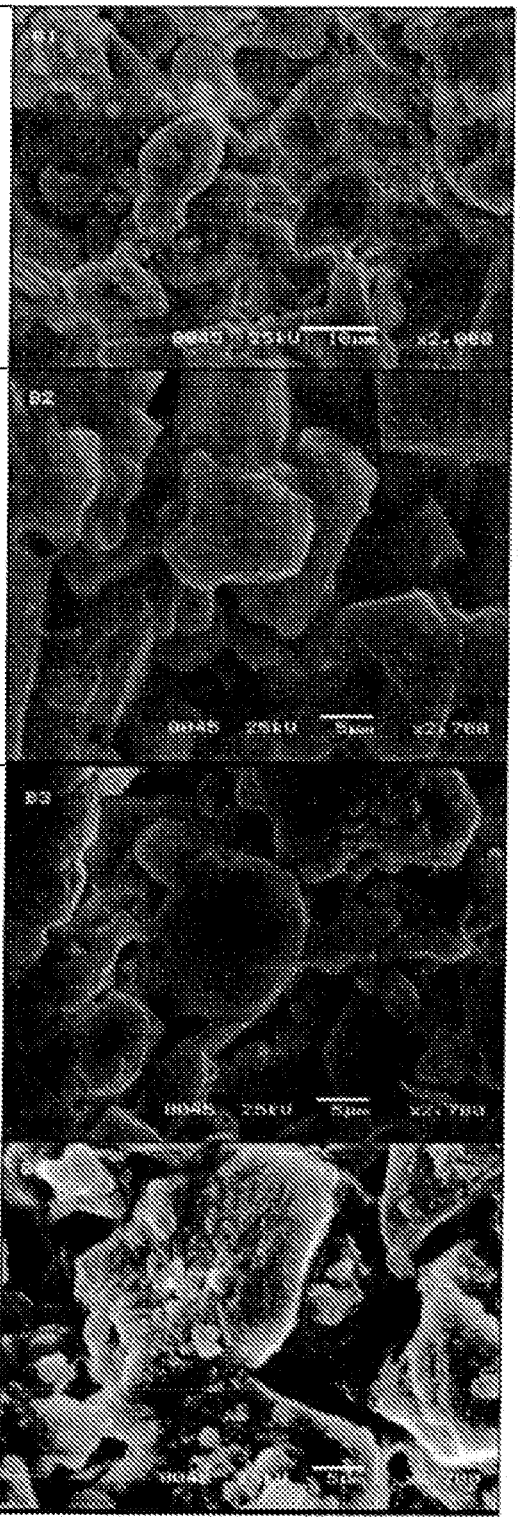
FIG. 5 represents several SEM micrographs of four glass-ceramic samples formed by sintering at 1200° C.

FIG. 4 shows x-ray diffraction patterns of each of the four glass-ceramic samples sintered at 1200° C. for five hours. These x-ray diffraction patterns indicate that the glass-ceramic material of each of the four examples comprises a combination of cordierite and forsterite crystal structures. This is also shown in the SEM photomicrographs of each of the four examples in FIG. 5. In FIG. 5, in the Example 1 picture, cordierite crystals appear like flakes with some regular faces with tiny crystals in-between. In FIG. 5, in the Example 2 picture, cordierite crystals appear like flakes with more regular faces connected by glassy matrix. In FIG. 5, in the Example 3 picture, as in Example 1, cordierite appears as euhedral hexagonal crystals connected together by residual glass. In FIG. 5, in the Example 4 picture, the microstructure appears like the Example 3 microstructure with some tiny crystals.

Figure 6:
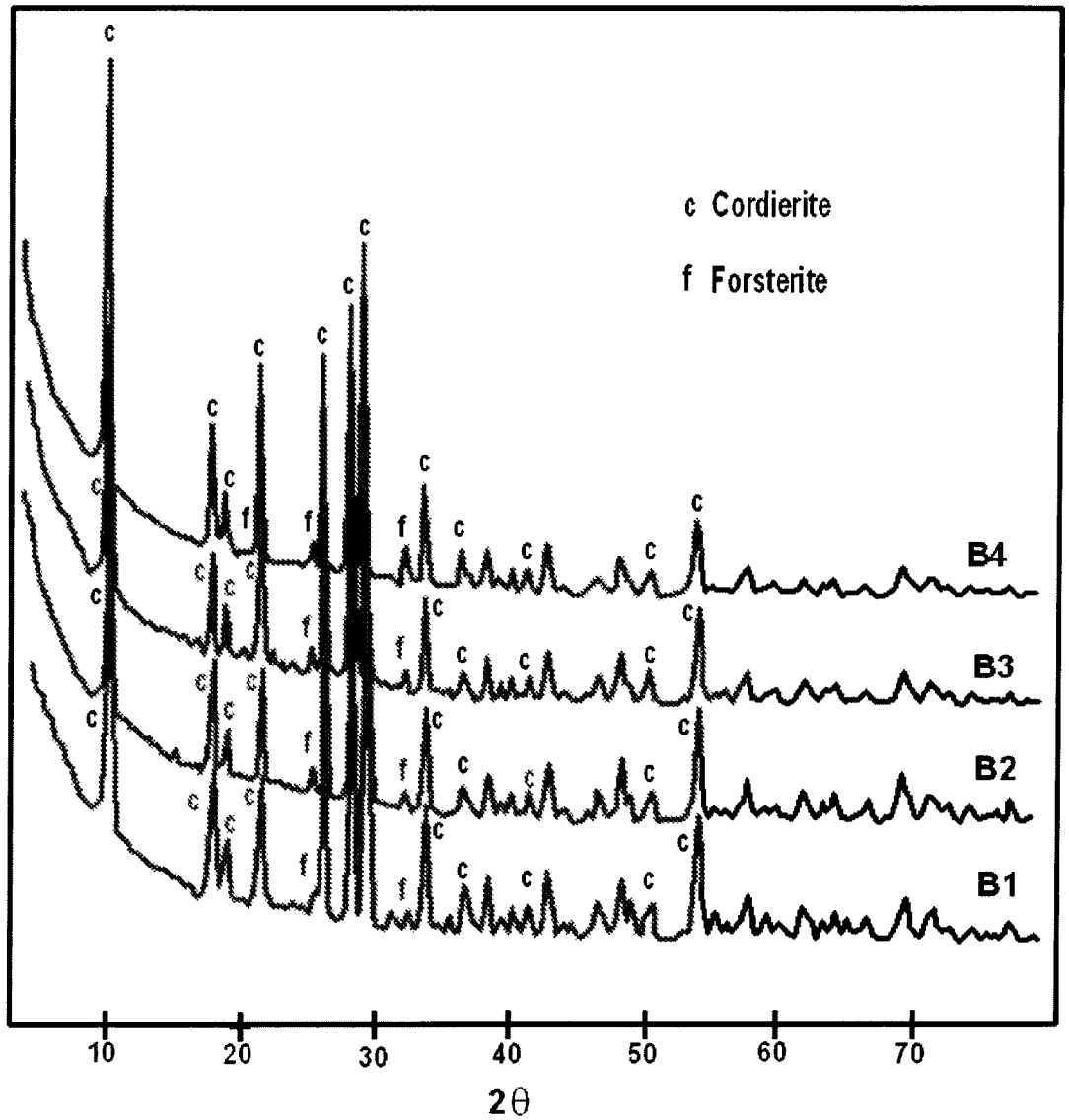
FIG. 6 shows x-ray diffraction patterns of the four glass-ceramic samples sintered at 1375° C.
Figure 7:
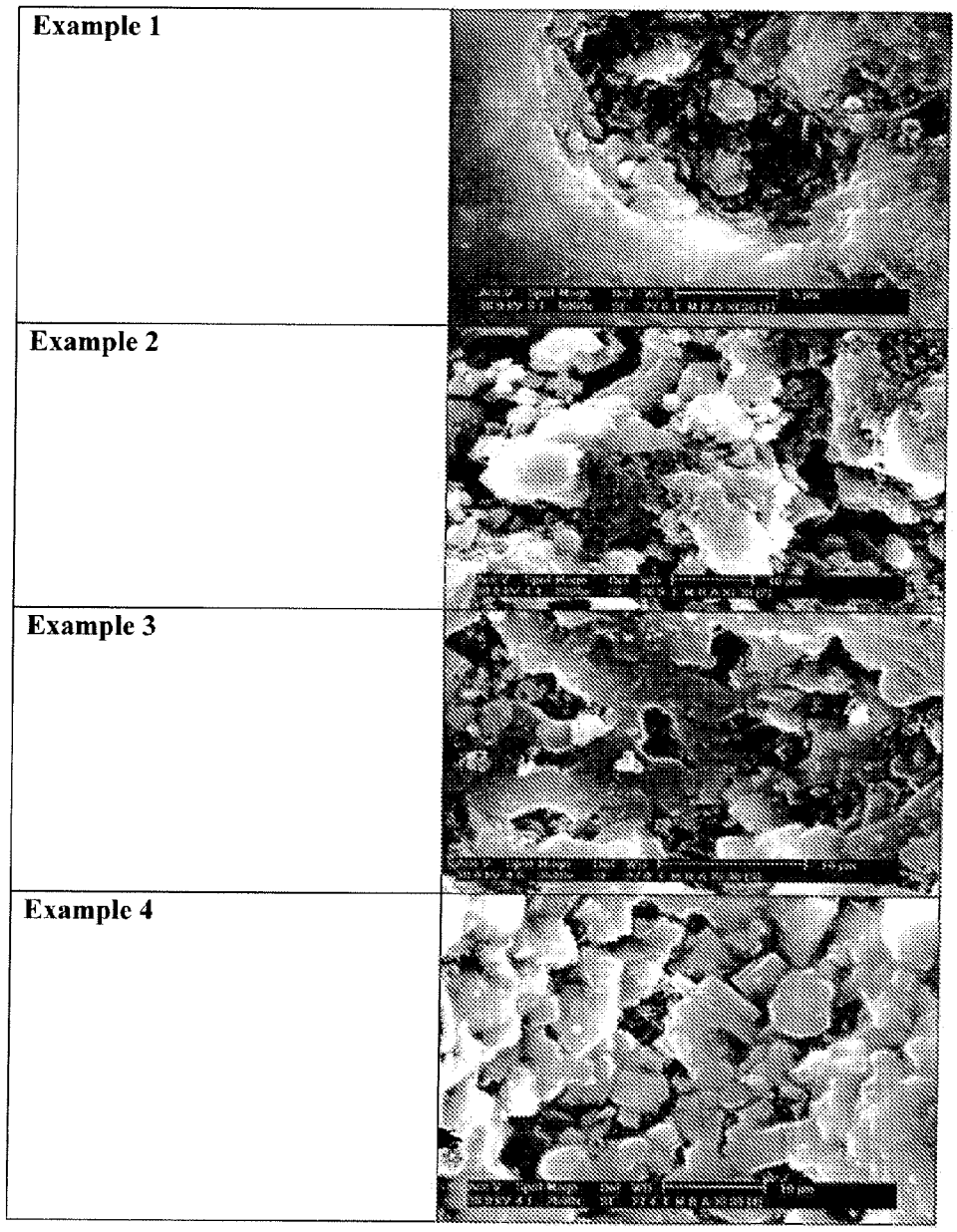
FIG. 7 represents several SEM micrographs of four glass-ceramic samples formed by sintering at 1375° C.

FIG. 6 shows x-ray diffraction patterns of each of the four glass-ceramic samples sintered at 1375° C. for five hours. These x-ray diffraction patterns indicate that the glass-ceramic material of each of the four examples also comprises a combination of cordierite and forsterite crystal structures. This is also shown in the SEM photomicrographs of each of the four examples in FIG. 7. In FIG. 7, in both the Examples 1 and 2 pictures, cordierite crystals are embedded in glassy matrix with some euhedral crystals. In FIG. 7, in the Example 3 picture, cordierite crystals are embedded in glassy matrix with some euhedral tiny and stout crystals. In FIG. 7, in the Example 4 picture, a microstructure similar to Example 3 is shown with some hexagon-like crystals detected in different orientation.

Figure 8:
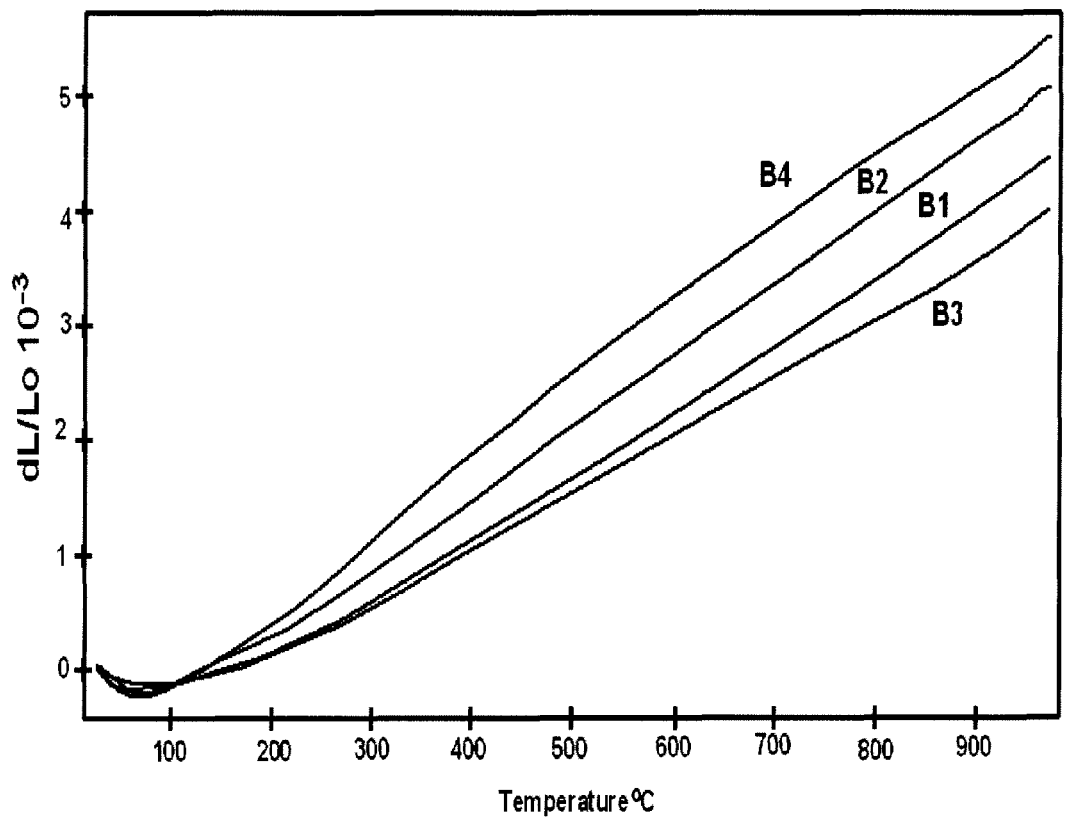
FIG. 8 shows the coefficient of thermal expansion of the four glass-ceramic samples sintered at 1200° C.

The Coefficient of Thermal Expansion (CTE) of the several sintered samples ranges between −28.38 and 57.75×10$^{-7}$° C.$^{-1}$ in the temperature range of 25° C. to 1000° C. This is shown in the following Table 3 as well as in FIG. 8.

TABLE 3

Coefficient of Thermal Expansion of the Sintered Glass-Ceramic Samples

Values of Coefficient of thermal expansion (×10$^{-7}$ ° C.$^{-1}$)

| Example No. | 27-100 | 27-200 | 27-300 | 27-400 | 27-500 | 27-600 | 27-700 | 27-800 | 27-900 | Other Ranges |
|---|---|---|---|---|---|---|---|---|---|---|
| 1 | −23.64 | 4.99 | 19.61 | 28.43 | 34.24 | 38.27 | 41.11 | 43.58 | | 27-867° C. 44.81 |
| 2 | −25.74 | 13.79 | 29.24 | 38.48 | 44.11 | 47.20 | 49.39 | 51.25 | 52.47 | 27-971° C. 53.57 |

TABLE 3-continued

Coefficient of Thermal Expansion of the Sintered Glass-Ceramic Samples

Values of Coefficient of thermal expansion ($\times 10^{-7}$ °C.$^{-1}$)

| Example No. | 27-100 | 27-200 | 27-300 | 27-400 | 27-500 | 27-600 | 27-700 | 27-800 | 27-900 | Other Ranges |
|---|---|---|---|---|---|---|---|---|---|---|
| 3 | −27.06 | 3.67 | 17.65 | 26.13 | 31.42 | 34.94 | 37.22 | 39.05 | | 26-950° C. 41.23 |
| 4 | −28.38 | 20.29 | 39.38 | 49.67 | 54.07 | 56.28 | 57.20 | 57.95 | 57.75 | 26-960° C. 58.25 |

Figure 9:
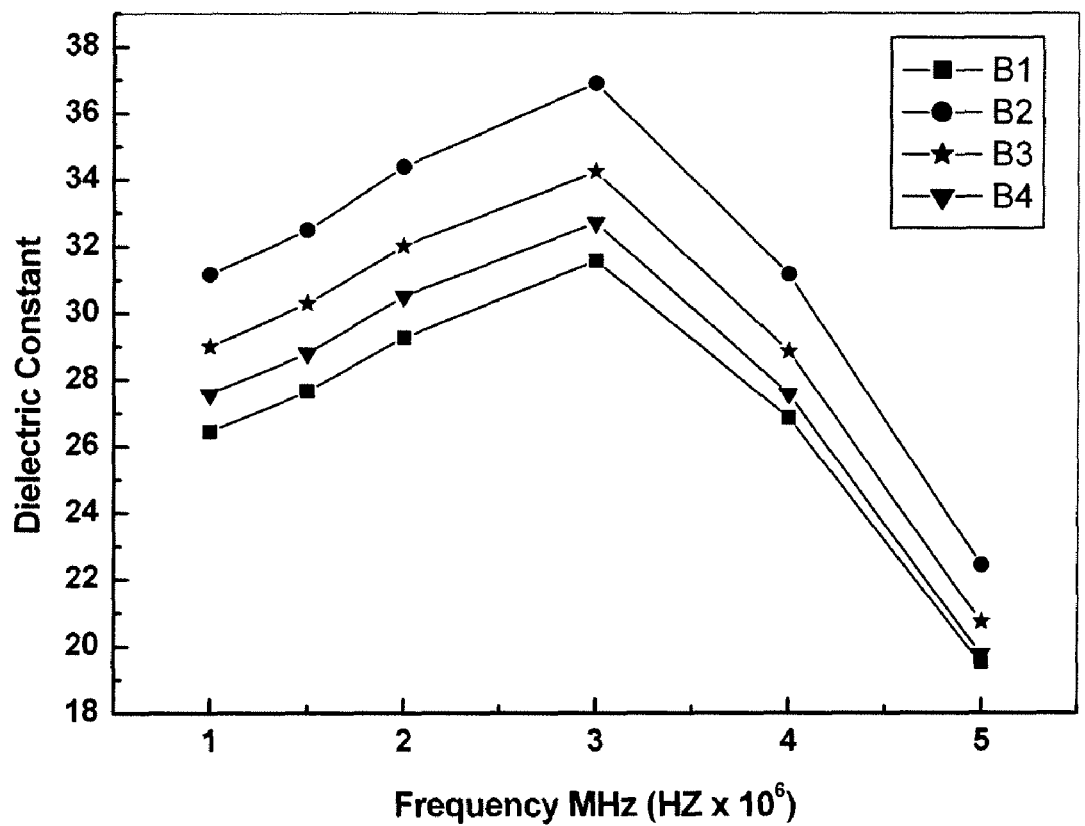
FIG. 9 shows the dielectric constant of the four glass-ceramic samples.

The dielectric constant values for the sintered samples range between 9 and 35 in the 1-5 MHz frequency range at room temperature. This is shown in FIG. 9.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A glass-ceramic body prepared from all natural raw materials by a process comprising:
    a) combining the natural raw materials white sand, kaolin and magnesite in relative amounts suitable to provide, upon subsequent homogenization and heat treatment, a mixture of oxides comprising from about 50 wt % to 60 wt % of $SiO_2$, from about 25 wt % to 35 wt % of $Al_2O_3$, from about 8 wt % to 12 wt % of MgO, from about 2.5 wt % to 3.5 wt % of $TiO_2$, and from about 0.5 to 1.0 wt % of $Fe_2O_3$;
    b) melting the combination of natural raw materials at a temperature of from about 1500° C. to 1550° C. to form glass material and subsequently quenching said glass material;
    c) crushing said quenched glass material to frit having a median particle diameter of no greater than about 65 microns;
    d) consolidating the crushed glass frit into a body;
    e) sintering said body at a temperature of from about 1000° C. to 1375° C. for a sufficient time to devitrify at least a portion of the glass into a polycrystalline material; and
    f) cooling to provide a sintered glass-ceramic body comprising a polycrystalline material which is primarily cordierite.

2. The glass ceramic body according to claim 1, wherein said white sand, kaolin and magnesite are all naturally occurring materials found within the Kingdom of Saudi Arabia.

3. The glass ceramic body according to claim 1, wherein said mixture of oxides further comprises up to about 0.18 wt % of CaO and/or up to about 0.23 wt % of $Na_2O$.

4. The glass ceramic body according to claim 1, wherein said white sand, kaolin and magnesite are combined to provide a combination of raw materials comprising from about 7.00 wt % to 21.00 wt % of white sand, from about 70.00 wt % to 60.00 wt % of kaolin and from about 22.00 wt % to 19.00 wt % of magnesite.

5. The glass ceramic body according to claim 1, wherein said quenched glass is crushed to fit having a median particle diameter of no greater than about 50 microns.

6. The glass ceramic body according to claim 1, wherein said crushed frit is consolidated into a body at a compaction pressure ranging from about 50 MPa to 200 MPa.

7. The glass ceramic body according to claim 1, wherein said body is sintered at a temperature of from about 1250° C. to 1350° C. for a period of from about 2 to 5 hours.

8. The glass ceramic body according to claim 1, wherein said sintered glass-ceramic body comprises from about 85 wt % to 95 wt % of polycrystalline phase.

9. The glass ceramic body according to claim 1, wherein said polycrystalline phase in said sintered glass-ceramic body comprises at least about 80-90% by weight of cordierite.

10. The glass ceramic body according to claim 9, wherein said polycrystalline phase of said sintered glass-ceramic body comprises both cordierite and forsterite.

11. The glass-ceramic body according to claim 1 having a microhardness value ranging from about 650 to 800 kg/mm$^2$ and a density ranging from about 2.5 to 2.6 g/cm$^3$.

12. The glass-ceramic body according to claim 1 having a coefficient of thermal expansion which ranges from about −28.38 to 57.75×10$^{-7}$° C.$^{-1}$ in the temperature range of from 28° C. to 1000° C.

13. The glass-ceramic body according to claim 1, having a dielectric constant ranging from about 19 to 35 in the 1 to 5 MHz frequency range.

14. A sintered glass-ceramic body comprising a mixture of oxides of at least 2.5 wt % to 3.5 wt % of $TiO_2$, and from about 0.5 to 1.0 wt % of $Fe_2O_3$, and from about 85 wt % to 95 wt % of polycrystalline phase, of which is at least about 80% by weight of cordierite, wherein the sintered glass-ceramic body further comprises traces of forsterite.

15. A sintered glass-ceramic body devitrified into a polycrystalline material which is primarily cordierite, composed from a combination of all natural raw materials comprising a combination of natural raw materials of white sand, kaolin and magnesite in relative amounts suitable to provide, upon subsequent homogenization and heat treatment, a mixture of oxides comprising from about 50 wt % to 60 wt % of $SiO_2$, from about 25 wt % to 35 wt % of $Al_2O_3$, from about 8 wt % to 12 wt % of MgO, from about 2.5 wt % to 3.5 wt % of $TiO_2$, and from about 0.5 to 1.0 wt % of $Fe_2O_3$, formed by a process comprising:
  a) melting the combination of natural raw materials at a temperature of from about 1500° C. to 1550° C. to form glass material and subsequently quenching said glass material;
  b) crushing said quenched glass material to frit having a median particle diameter of no greater than about 65 microns;
  c) consolidating the crushed glass frit into a body;
  d) sintering said body at a temperature of from about 1000° C. to 1375° C. for a sufficient time to devitrify at least a portion of the glass into a polycrystalline material; and
  e) cooling to provide a sintered glass-ceramic body comprising a polycrystalline material which is primarily cordierite.

16. The glass ceramic body according to claim 1, wherein the sintered glass ceramic body comprises 2.8-3.4 wt % $TiO_2$ and 0.65-0.75 wt % $Fe_2O_3$.

17. A sintered glass-ceramic body comprising from about 85 wt % to 95 wt % of polycrystalline phase, of which is at least about 80% by weight of cordierite, wherein the sintered glass ceramic body comprises 2.5-3.5 wt % $TiO_2$ and 0.5-1 wt % $Fe_2O_3$.

* * * * *